United States Patent [19]
Shimizu

[11] Patent Number: 6,152,100
[45] Date of Patent: Nov. 28, 2000

[54] SPARE SPARK PLUG HOLDER FOR SNOWMOBILES

[75] Inventor: Toshiharu Shimizu, Shizuoka, Japan

[73] Assignee: Yamaha Hatsudoki Kabushiki Kaisha, Iwata Shizuoka, Japan

[21] Appl. No.: 09/357,945

[22] Filed: Jul. 21, 1999

[51] Int. Cl.$^7$ .................................................. F02B 77/00
[52] U.S. Cl. ...................................... 123/198 R; 248/314
[58] Field of Search ........................... 123/198 E, 198 R; 248/314

[56] References Cited

U.S. PATENT DOCUMENTS

| | | | |
|---|---|---|---|
| 3,851,847 | 12/1974 | Hinkley | 248/314 |
| 3,910,541 | 10/1975 | German | 248/314 |

Primary Examiner—Noah P. Kamen
Attorney, Agent, or Firm—Bacon & Thomas, PLLC

[57] ABSTRACT

A holder for a spare spark plug for an internal combustion engine in a snowmobile is provided on an engine accessory such as an air intake silencer for the engine, and wherein the holder includes a receptacle for receiving the threaded electrode end of a spare spark plug and a clamp for the opposite terminal end of the spark plug. The terminal end clamp is configured to retain the spark plug against substantial axial movement out of the receptacle while permitting lateral displacement of the terminal end of the spark plug to permit removal of the spark plug from the receptacle. The holder and terminal end clamp may be integrally formed as one piece with an air intake silencer. The receptacle is configured to shield the electrode end of the spark plug when it is installed in the receptacle.

25 Claims, 5 Drawing Sheets

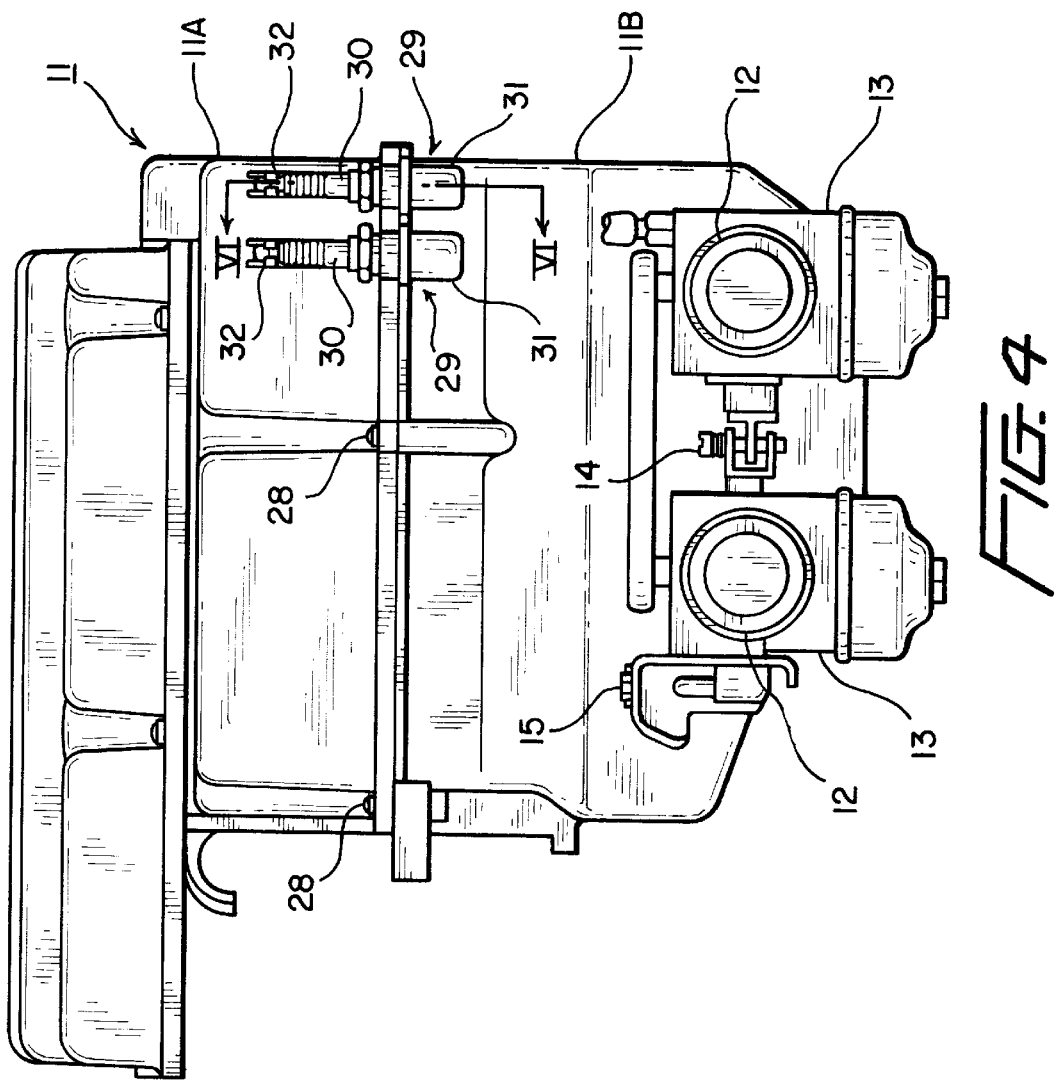
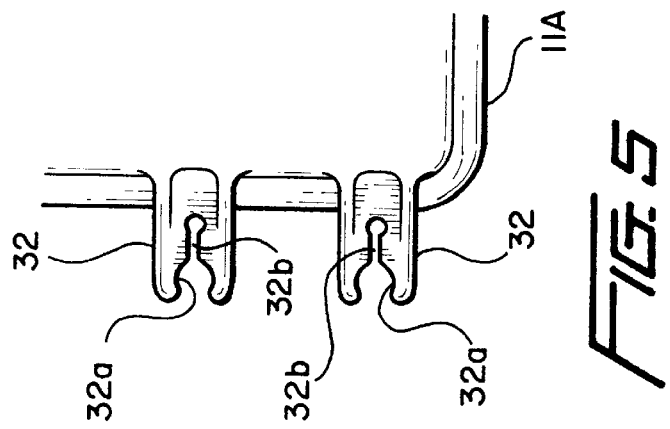

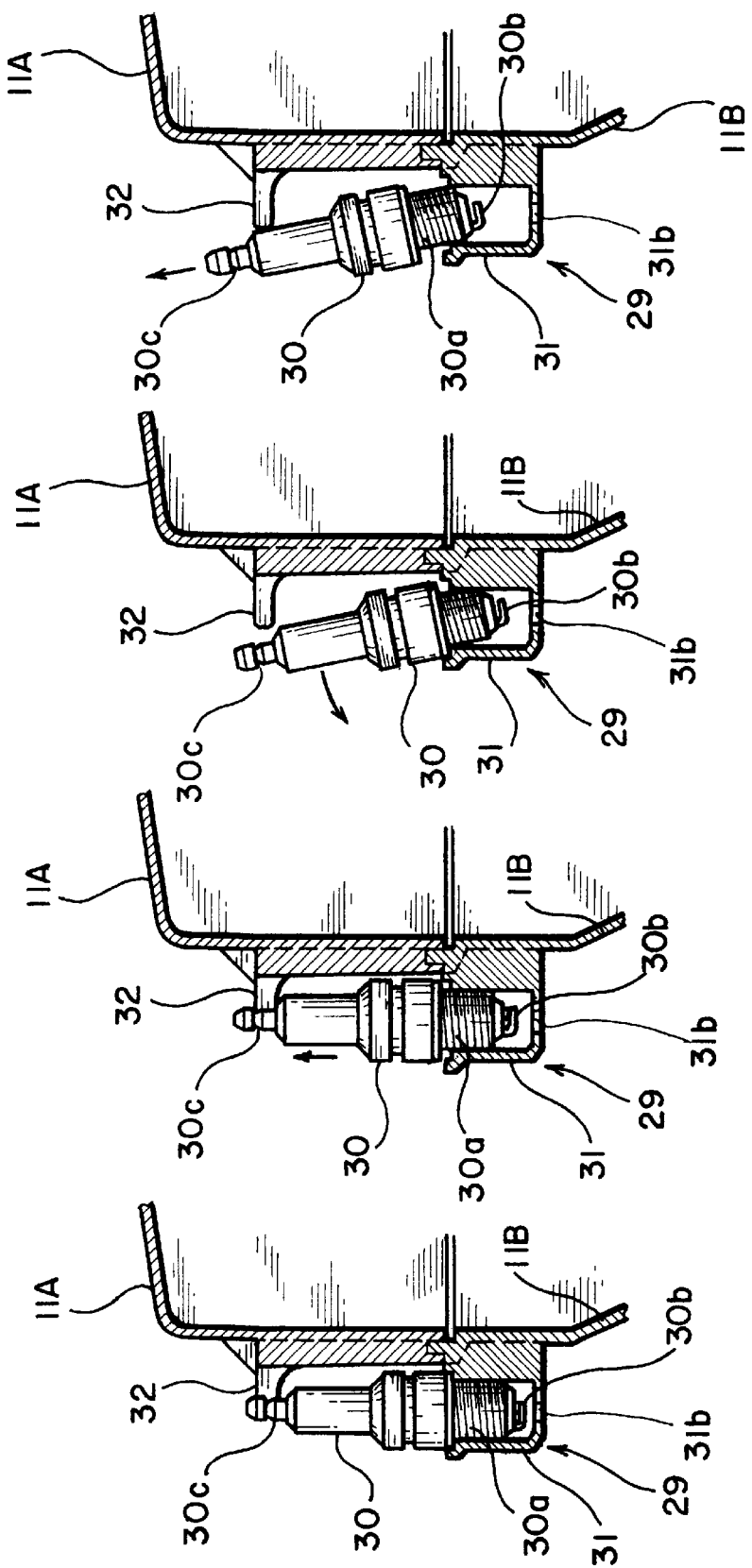

SPARE SPARK PLUG HOLDER FOR SNOWMOBILES

BACKGROUND OF THE INVENTION

1. Field of the Invention

The present invention relates to a spare spark plug holder accessory for use with small personal motor driven vehicles such as snowmobiles.

2. Description of Related Art

Most snowmobiles are propelled over snow-covered surfaces by means of an endless track belt which is mounted at the rear of the vehicle chassis and powered by a carbureted, gasoline engine mounted near the front of the chassis. The low temperature environment in which these vehicles typically operate can prevent adequate vaporization of the fuel in the carburetor and create a "Wet spark plug" condition where the plug will not spark because it is coated with condensed fuel. Since this condition can be easily remedied by replacing the wet sparkplug with a dry one, snowmobiles are often equipped with a space to store interchangeable dry spark plugs, referred to here as "spare plugs," for easy replacement.

The spare plugs are preferably stored in a place where they are easily removable and installable, even under cold temperature conditions. They must also be firmly secured to the vehicle in order to prevent the often jarring ride of the snowmobile from damaging the delicate electrode portion of the plug. Consequently, spare plugs have conventionally been stored inside the engine compartment of the snowmobile using a separate plug holder structure. However, spare plugs which are stored inside the engine compartment can come into contact with snow that is kicked up by the track belt when the vehicle is running. Furthermore, the requirement for a separate holder structure increases the number of components, and corresponding cost, for manufacturing the snowmobile.

SUMMARY OF THE INVENTION

These and other drawbacks associated with the conventional technology are addressed by providing a spare plug holder structure in which the spare plug can be easily removed or installed without increasing the number of components or cost of the snowmobile. For example, a spark plug holder for a snowmobile may be provided which includes a hollow receptacle having an opening at one end for receiving at least a portion of the spare plug and protecting an electrode of the spare plug, wherein the receptacle is formed in one piece with another portion of said snowmobile, preferably the air intake silencer. The receptacle is preferably formed on a surface of the air intake silencer that faces toward the engine and is horizontally spaced from an outlet of the air intake silencer. The receptacle may also included a bottom wall having a drain hole formed therein.

The holder may also include a support member, arranged over the hollow cylinder, for supporting a terminal end of the spare plug. The support member is also formed in one piece with a portion of the snowmobile, preferably the air intake silencer, that is closely adjacent the other portion that forms the receptacle. Furthermore, each of the receptacle and the terminal support member may be formed in one piece with the air intake silencer, on a surface of the air intake silencer which faces the engine. When the air intake silencer includes a top member and a bottom member, the support member may be formed in one piece with the top member, and the receptacle formed in one piece with the bottom member.

BRIEF DESCRIPTION OF THE SEVERAL VIEWS OF THE DRAWINGS

The invention will now be described with respect to the drawings wherein the figures have been labeled with numerals used to identify the same features throughout each of the figures, and wherein

FIG. 4 is a detail view taken along line IV—IV in FIG. 3 showing a front view of the air intake silencer and carburetor;

FIG. 5 is a partial top view of the spare plug support member formed on the air intake silencer in FIG. 4; and FIGS. 6($a$) through ($d$) are partial sectional views taken along section line VI—VI in FIG. 4 showing a procedure for removing a spare plug, where the spare plug is shown in full side view.

DETAILED DESCRIPTION OF THE INVENTION

Figure 1:
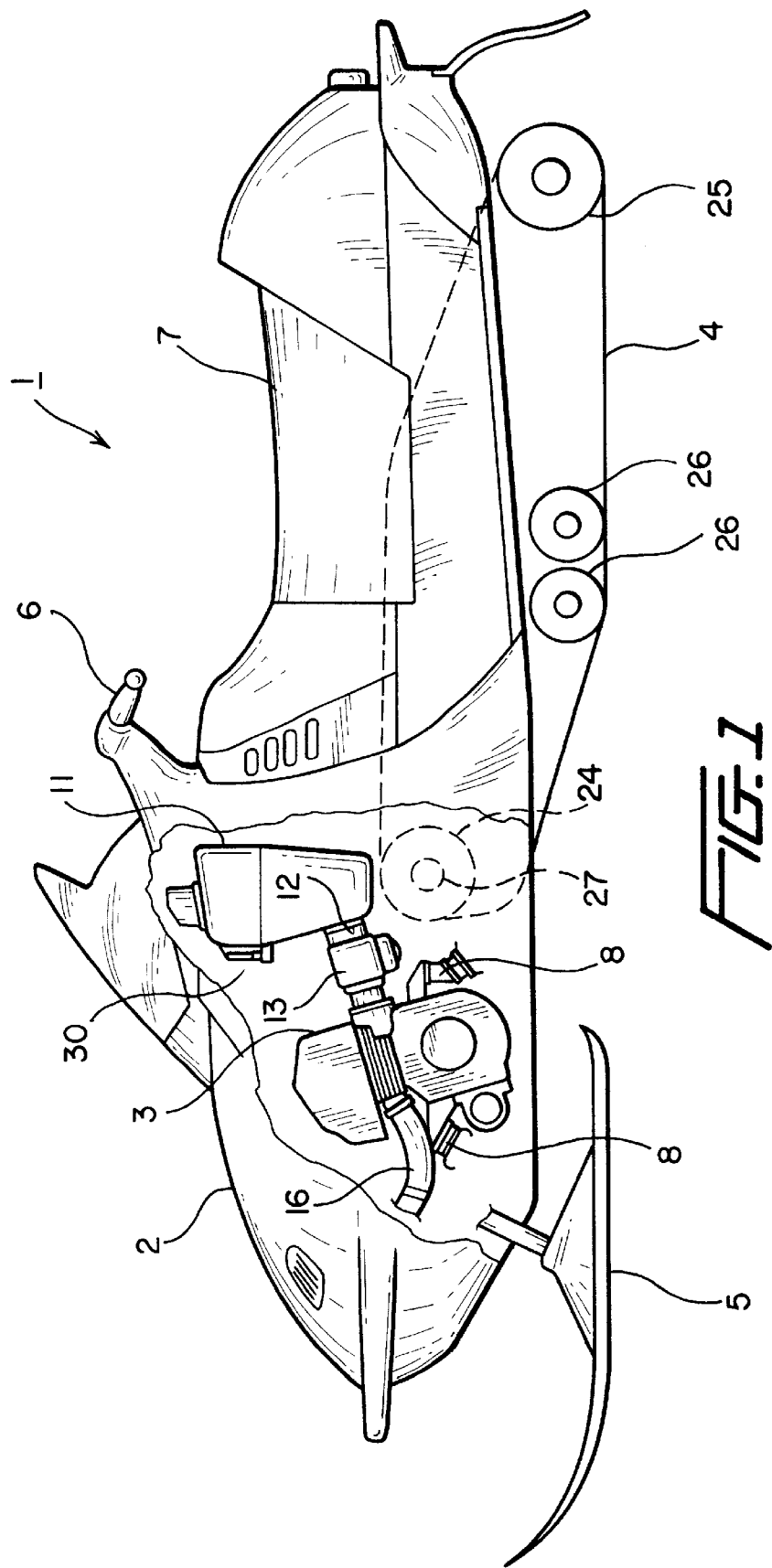
FIG. 1 is a side elevational view of a snowmobile showing a cutaway of the engine compartment.

FIG. 1 shows a snowmobile 1 including a hood 2 for covering an engine 3 situated at the front of the vehicle chassis. The engine shown here is a two-cycle, two-cylinder spark-ignited gasoline engine. However, a variety of other engines may also be used.

The engine 3 drives a track belt 4 at the rear of the chassis for propelling the snowmobile 1 over a snow-covered surface. The front of the chassis is supported on a pair of skis 5 which can be turned in the desired direction using the steering handlebars 6. A seat 7 is arranged in the back portion of the chassis, behind the handlebars 6, for supporting the driver and any passengers. The engine 3 is resiliently supported by a plurality of rubber mounts 8.

Figure 2:
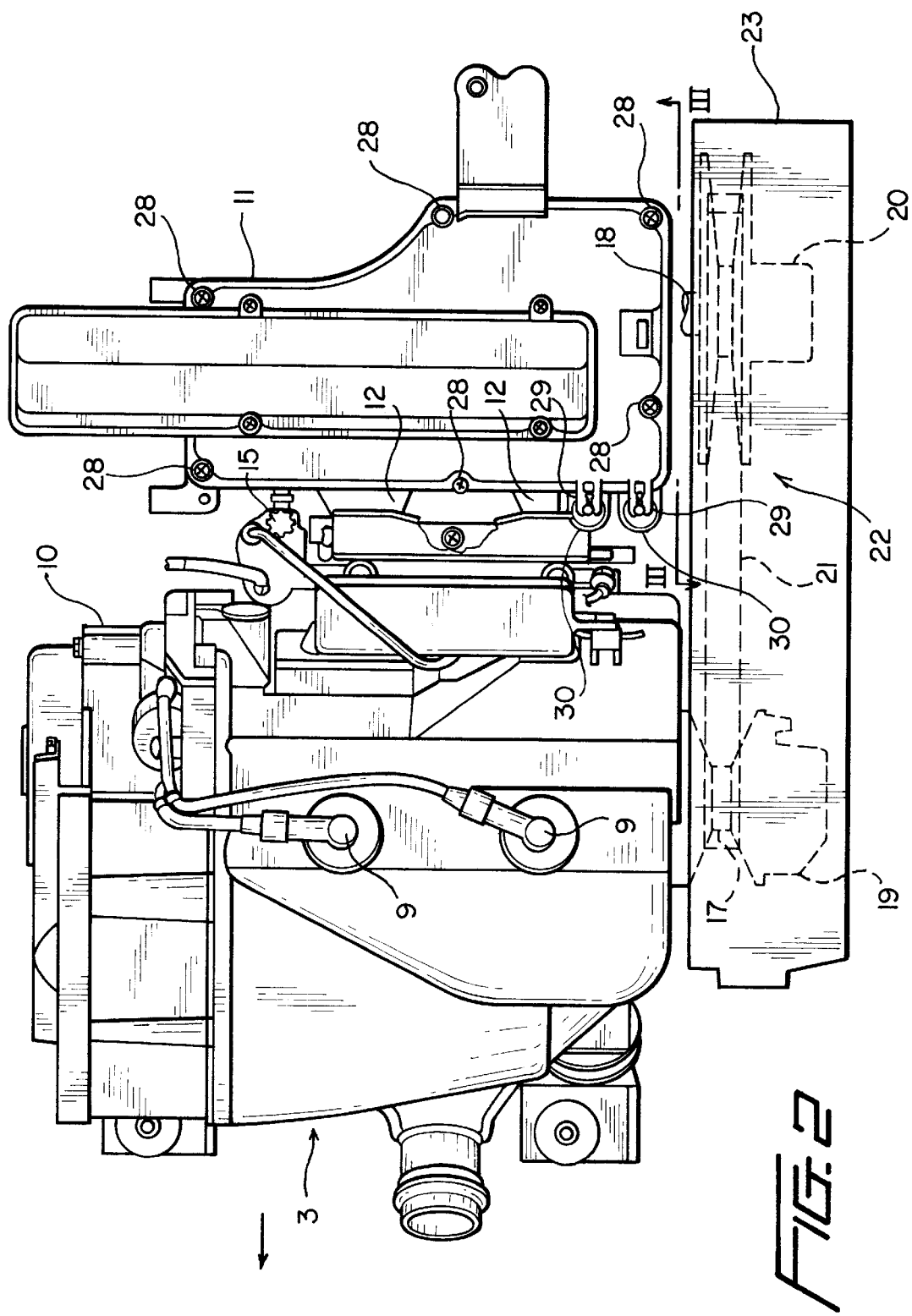
FIG. 2 is a top view of the engine in FIG. 1.
Figure 3:
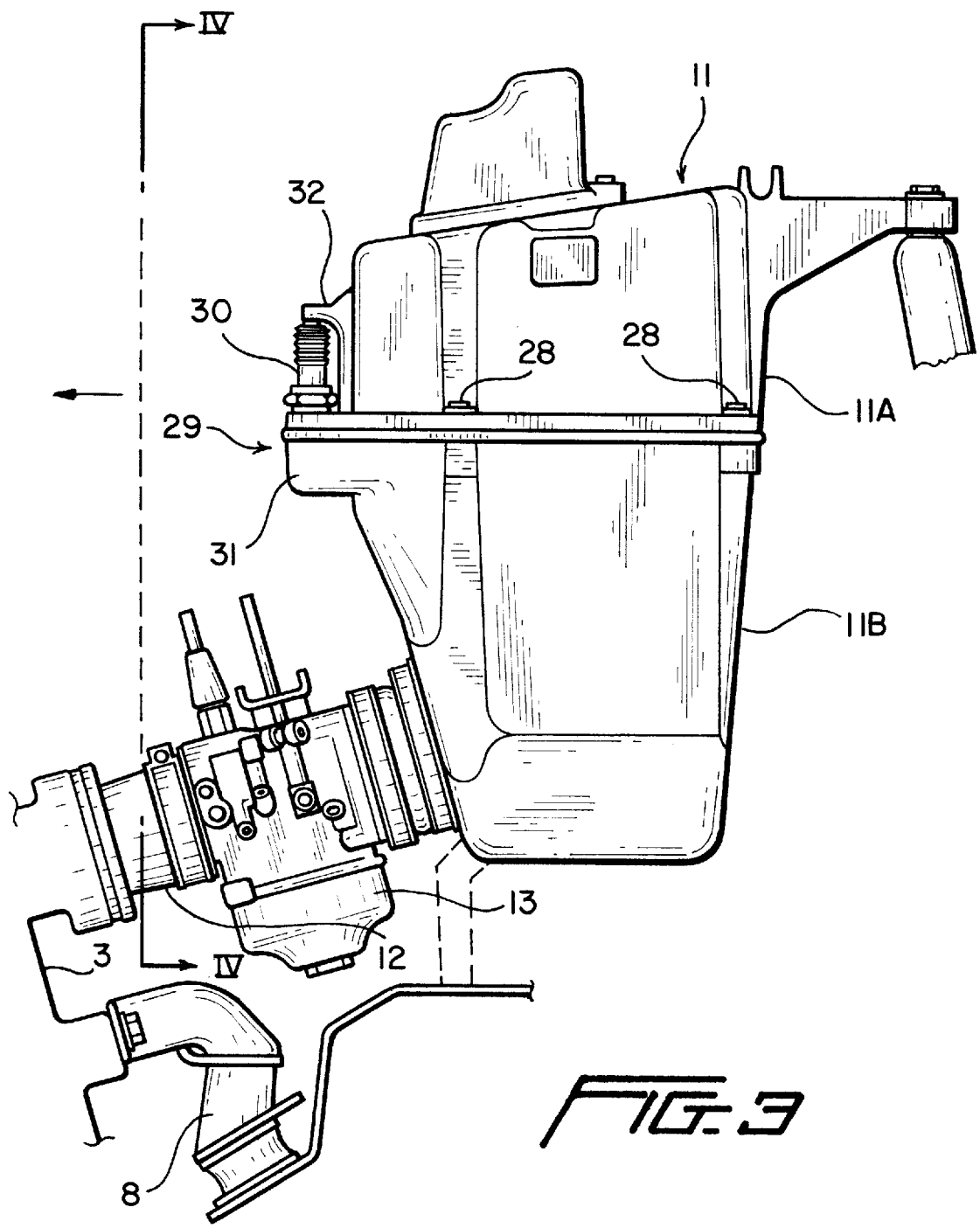
FIG. 3 is a detail view taken along line III—III in FIG. 2 showing a side view of the air intake silencer.

As illustrated in the top plan view of the engine 3 which is shown in FIG. 2, the spark plugs 9 are mounted in the top side of the engine 3 extending into cylinders which are positioned transverse to the length of the snowmobile 1. A generator 10 is mounted on the right side of the engine 3 while an air intake silencer 11 is arranged behind the engine. FIGS. 3 and 4 show a pair of air supply ducts 12 constituting an air intake for the engine and extending from the bottom of the carburetors 13 that prepare an air-fuel mixture that is supplied to the intake manifold (not numbered) of the engine 3. An adjustment screw 14 is mounted between the carburetors 13 and the right carburetor is connected to an idle adjustment screw 15. The engine 3 then discharges exhaust gases into an exhaust manifold connected to an exhaust pipe 16, shown in FIG. 1, which extends rearward toward a muffler (not shown) in a typical U-shaped exhaust system.

Turning now to the drive system for the snowmobile 1, FIG. 2 shows an output shaft 17 which extends horizontally from the left side of the engine 3 and supports a drive pulley 19 carrying a V-belt 21. The V-belt 21 drives a follower pulley 20 mounted on a follower shaft 18 forming part of an automatic transmission 22 which is protected by a cover 23. As shown in FIG. 1, the track belt 4 is fitted around a drive wheel 24, a follower wheel 25, and a plurality of idler wheels 26. The drive wheel 24 is then attached to a drive shaft 27 which is connected by a chain drive system (not shown) to the follower shaft 18 extending from the automatic transmission 22 shown in FIG. 2. When the snowmobile 1 being driven, the rotational output of the engine 3 is transferred from the drive shaft 17 through the automatic transmission 22 which controls the speed and/or torque provided by the follower shaft 18. Power from the follower shaft 18 is then transmitted by a chain drive mechanism (not shown) to the drive shaft 27 which causes the drive wheel 24 to rotate at the desired speed. In turn, the drive wheel 24 drives the track belt 4 which engages the snow under the track belt and propels the snowmobile 1.

Turning to the air intake silencer 11, FIG. 4 illustrates the air intake silencer formed in two halves, with each half formed as a single unitary component. The top half member 11A is secured to the bottom half member 11B by a plurality of screws 28 arranged around the perimeter of the top and bottom halves so as to form a rectangular, box-shaped structure. Two spare spark plug holders 29 are integrally formed on the front side of the air intake silencer 11 which faces the engine 3 in an area above an to one side of the air intake tubes 12. As shown in FIGS. 5 and 6, the plug holders 29 include receptacles 31 which preferably are formed in one piece, integral with the front surface of the lower half 11B, and terminal support members 32 which are also formed in one piece, integral with the front surface of the top member 11A. The support members 32 and receptacles 31 may also be formed together on either one of the same top half member 11A or bottom half member 11B.

Referring to FIG. 6, the plug holders 29 preferably include receptacles 31 including a container, or cup portion, 31 a which is open at the top and closed by a bottom wall at the bottom, except for a small-diameter drain hole 31 b in the bottom wall of the container. Plug terminal support members 32 are arranged above and closely adjacent each of the receptacles 31 a and project forwardly from the upper member 11A of the air intake silencer 11. Each support member 32 includes an opening leading to a notched fitting 32a and a split, or slot, 32b for allowing the notched fitting to expand or flex. The diameter of the notched fitting 32a is slightly smaller than the diameter of the corresponding terminal 30b of the spare plug 30 so that the notched fitting will elastically deform around the spare plug when it is placed in the holder 29 as discussed in more detail below.

The spare plugs 30 are removably fitted in the plug holders 29 as shown in FIGS. 2 through 4 and 6(a). As shown in more detail in FIG. 6(a), Each spark plug includes a conventional threaded end 30a and an electrode 30b normally exposed at the threaded end. The threaded end 30a and terminal 30b of the spark plug 30 fits into the receptacle 31 while the terminal portion 30c is frictionally secured in the notched fitting 32a of the support member 32. The support member 32 can also be arranged to support the terminal 30c at places other than at its tip. The electrode 30b is thus shielded against moisture, dirt and deformation inside the receptacle 31 while the spare plug 30 is retained in place by the support member 32. Consequently, should a wet spark plug condition occur, the rider can open the hood 2 of the snowmobile I and easily exchange the wet plugs 9 in the engine 3 for the spare plugs 30 stored in the plug holders 29.

The procedure for withdrawing a spare plug 30 from the plug holder 29 is shown in FIG. 6. As shown in FIG. 6(b), the spare plug 30 is first lifted axially slightly upward. Then, as shown in FIG. 6(c), the top or terminal end of the spare plug 30 is pivoted out of the holder 32 toward the front of the vehicle with the threaded end of the spare plug 30 serving as the axis of rotation. Finally, as shown in FIG. 6(d), the spare plug 30 is lifted diagonally out of the receptacle 31. Accordingly, the spare plug 30 is easily removable from the plug holder 29 in one smooth action. The procedure for installing a plug and the plug holder 29 is similarly performed in reverse order.

The depth of the receptacle is greater than the length of the electrode 30b of the spare plug 30 so that regardless of the vertical position of the spare plug 30, the electrode 30a remains shielded inside the cylinder 31. The conventional small step, or groove, in the terminal 30c also helps to maintain the vertical positioning of the spare plug 30 inside the support member 32 of the plug holder 29.

The invention disclosed here offers numerous advantages over conventional technology by providing a plug holder 29 which is integrally formed with the snowmobile for retaining one or more spare plugs 30. For example, when the plug holders 29 are formed in one piece, integral with the front surface of the air intake silencer 11, they can be provided without increasing the number of parts, and corresponding costs, for manufacturing the snowmobile 1. The location of the plug holders 29 on the outside front surface of the air intake silencer 11 does not reduce the internal volume of the air intake silencer and makes effective use of the dead space between the air intake silencer 11 and the engine 3. This position also does not interfere with access to the carburetors 13 and air intake tubes 12 which would otherwise make engine maintenance more difficult.

Since the air intake silencer 11 is not exposed to as much vibration as the rest of the snowmobile 1, the spare plugs remain securely held and undamaged even during jarring of the snowmobile chassis. The front face of the air intake silencer 11 is also unlikely to be exposed to any snow which is kicked-up by the track belt 4. Furthermore, any snow that does reach the holders 29 is unlikely to move inside the receptacle 31, and, even if it did, it would simply melt and flow out through drain hole 31b rather than accumulating against the electrode 30a.

Although the illustrated embodiments have been described with respect to two plug holders which accommodate the same number of plugs as are used by the engine 3, it is also possible to form additional, or fewer, plug holders for holding additional, or fewer spare plugs.

Although the invention has been was described above with respect to various preferred embodiments, it will be readily understood to one of ordinary skill in the art that various changes and/or modifications may be made without departing from the spirit of the invention. It is therefore intended that the scope of protection for the invention be limited only by the scope of the following claims.

What is claimed is:

1. A holder for a spare spark plug for an internal combustion engine having an air supply system, said spark plug including a threaded end area and an exposed electrode adjacent said threaded end area, said holder comprising:

an air silencer assembly for an engine air supply system;

a receptacle dimensioned and configured to receive and support at least the threaded end area of a spare spark plug while shielding an exposed electrode of such spare spark plug when the threaded end area is disposed in the receptacle;

said holder secured to said silencer assembly.

2. A holder as claimed in claim 1, wherein said receptacle has an open end for receiving said threaded end and a bottom wall closing an opposite end thereof, and an aperture in said bottom wall.

3. A holder as claimed in claim 1, wherein said receptacle is dimensioned to receive and support the threaded end area only of a spare spark plug with the remainder of the spare spark plug extending outside said receptacle;

said spare spark plug including a terminal end axially opposite said threaded end;

said holder comprising a terminal end support carried by the silencer assembly and arranged so a to engage and secure said terminal end of a spare spark plug against substantial axial movement relative to the receptacle when the threaded end area of such spare spark plug is disposed in said receptacle.

4. A holder as claimed in claim 3, wherein said support is configured to engage the terminal end of said spare spark plug only frictionally against displacement thereof in a direction laterally of an axial length of such spare spark plug when said threaded end area of such spare spark plug is disposed in said receptacle.

5. A holder as claimed in claim 3, wherein said receptacle and terminal end support are each formed in one piece with an element of said silencer assembly.

6. A holder as claimed in claim 3, wherein said silencer assembly is formed in at least two portions, and wherein said receptacle and terminal end support are respectively formed integrally as one piece with respective ones of said two portions of said silencer assembly.

7. A holder as claim in claim 1, wherein said receptacle is formed in one piece with an element of said silencer assembly.

8. A holder as claimed in claim 1, including an internal combustion engine in which such spare spark plug is useable and wherein said silencer assembly is located adjacent the engine and includes an air supply outlet in communication with an air intake duct of said engine;
said receptacle being vertically oriented and including an end wall defining a bottom wall of said receptacle, and an aperture defining a liquid drain in said bottom wall;
said silencer assembly including a side portion facing toward the engine;
said receptacle located on said side portion facing the engine and laterally displaced relative to said engine air intake duct.

9. A holder as claimed in claim 8, wherein said receptacle is dimensioned to receive and support the threaded end area only of such spare spark plug with the remainder of the spark plug extending outside said receptacle;
said spark plug including a terminal end axially opposite said threaded end area;
said holder comprising a terminal end support carried by the silencer assembly and arranged to engage and secure said terminal end against substantial axial movement relative to the receptacle when the threaded end area of said spare spark plug is disposed in said receptacle.

10. A holder as claimed in claim 9, wherein said receptacle and terminal end support are located above and towards one side of the silencer air supply outlet.

11. A holder for a spare spark plug of an internal combustion engine, such spark plug including an elongate body, a threaded end including an exposed electrode at one end of said body and an axially spaced terminal end at the opposite end of said body,
said holder including a receptacle dimensioned and configured to receive and enclose substantially only the threaded end area of such spark plug including said electrode;
a terminal end support including a clamping device axially spaced from said receptacle and configured to engage and secure against axial motion the terminal end of a spare spark plug when a threaded end thereof is disposed in said receptacle, and also dimensioned and configured to releaseably retain said terminal end against transverse displacement;
said receptacle and terminal end support dimensioned and configured to enable the terminal end of a spare spark plug having a threaded end area disposed in said receptacle to be moved laterally from said terminal end support and to be thereby released from said terminal end support while said threaded end area is pivoted within and axially moved away from said receptacle.

12. A holder as claimed in claim 11, wherein said terminal end support only frictionally retains said terminal end of a spare spark plug against displacement laterally of the said spark plug elongate body.

13. A holder as claimed in claim 11, wherein said receptacle includes a bottom end wall closing a bottom end of said receptacle and an aperture in said end wall defining a drain opening.

14. A holder as claimed in claim 11, including an air silencer assembly for an internal combustion engine;
said receptacle and terminal end support attached to said air silencer assembly.

15. A holder as claimed in claim 14, wherein said air silencer assembly is made of at least two parts and wherein said receptacle and said terminal end support are respectively formed integrally as one piece with separate ones of said parts of said silencer element.

16. In a snowmobile vehicle including a vehicle chassis, a spark ignited engine mounted in the forward area of the chassis, a track belt supported on the chassis and driven by the engine for propelling the vehicle, an engine intake air silencer mounted adjacent the engine, and at least one spark plug installed in the engine, said spark plug including a threaded end having an exposed electrode and threaded into a member of the engine, the improvement comprising:
a spare spark plug holder for retaining an interchangeable spare one of said spark plugs, wherein said spare spark plug likewise includes a threaded end area and exposed electrode adjacent said threaded end area;
said holder including a receptacle dimensioned and configured to hold and shield at least a threaded end area and exposed electrode of a spare spark plug;
said holder secured to said air intake silencer.

17. The improvement as claimed in claim 16, wherein said holder is vertically oriented relative to the vehicle chassis, and wherein said receptacle includes an open top end and a bottom wall, said bottom wall including an aperture defining a drain opening for said receptacle.

18. The improvement as claimed in claim 16, wherein said receptacle is dimensioned to receive and support the threaded end area and electrode only of said spare spark plug with the remainder of said spare spark plug extending outside said receptacle;
said spare spark plug including a terminal end axially opposite said threaded end area;
said holder comprising a terminal end support carried by the air intake silencer and arranged to engage and secure said terminal end of a spare spark plug against substantial axial movement relative to the receptacle when the threaded end area of said spare spark plug is disposed in said receptacle.

19. The improvement as claimed in claim 18, wherein said terminal end support is configured to engage the terminal end of a spare spark plug only frictionally against displacement thereof in a direction laterally of an axial length of such spare spark plug when said threaded end area of such spare spark plug is disposed in said receptacle.

20. The improvement as claimed in claim 18, wherein said air intake silencer is constructed of at least two connected upper and lower sections, and wherein said receptacle is secured to said lower section and said terminal end support is secured to said upper section.

21. The improvement as claimed in claim 20, wherein said receptacle and terminal end support are each formed in one piece respectively with said upper and lower sections.

22. The improvement as claimed in claim 16, wherein said receptacle is formed in one piece with an element of said air intake silencer.

23. The improvement as claimed in claim 16, wherein said air intake silencer is formed in at least two sections, and wherein said receptacle and terminal end support are respectively formed integrally as one piece with respect ones of said two sections of said air intake silencer.

24. The improvement as claimed in claim 16, wherein said air intake silencer includes a side portion facing towards said engine and wherein said receptacle is disposed on said side portion.

25. The improvement as claimed in claim 16, said air intake silencer having an air outlet duct in a lower portion thereof and said engine including an air inlet duct connected to said air outlet duct, said spare spark plug holder located above and laterally spaced relative to said air outlet duct.

* * * * *